US008352685B2

(12) United States Patent
Bannon et al.

(10) Patent No.: US 8,352,685 B2
(45) Date of Patent: Jan. 8, 2013

(54) COMBINING WRITE BUFFER WITH DYNAMICALLY ADJUSTABLE FLUSH METRICS

(75) Inventors: Peter J. Bannon, Concord, MA (US); Andrew J. Beaumont-Smith, Cambridge, MA (US); Ramesh Gunna, San Jose, CA (US); Wei-han Lien, San Jose, CA (US); Brian P. Lilly, San Francisco, CA (US); Jaidev P. Patwardhan, Sunnyvale, CA (US); Shih-Chieh R. Wen, San Jose, CA (US); Tse-Yu Yeh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 12/860,505

(22) Filed: Aug. 20, 2010

(65) Prior Publication Data
US 2012/0047332 A1    Feb. 23, 2012

(51) Int. Cl.
*G06F 12/00*    (2006.01)
*G06F 13/00*    (2006.01)
*G06F 13/28*    (2006.01)

(52) U.S. Cl. ........................................ 711/135; 711/118
(58) Field of Classification Search .................. 711/135, 711/118
See application file for complete search history.

(56) References Cited

U.S. PATENT DOCUMENTS

| | | | |
|---|---|---|---|
| 5,561,780 A * | 10/1996 | Glew et al. | 711/126 |
| 5,630,075 A | 5/1997 | Joshi et al. | |
| 5,892,937 A * | 4/1999 | Caccavale | 711/135 |
| 6,546,462 B1 | 4/2003 | Palanca et al. | |
| 6,658,533 B1 * | 12/2003 | Bogin et al. | 711/135 |
| 6,671,747 B1 | 12/2003 | Benkual et al. | |
| 7,418,555 B2 | 8/2008 | Chung | |
| 7,685,372 B1 | 3/2010 | Chen et al. | |
| 7,752,173 B1 * | 7/2010 | Gole | 707/654 |
| 2006/0095609 A1 | 5/2006 | Radhakrishnan et al. | |
| 2006/0184341 A1 * | 8/2006 | Di et al. | 703/2 |
| 2007/0143514 A1 | 6/2007 | Kaushik et al. | |
| 2009/0089470 A1 | 4/2009 | Ven | |
| 2009/0157936 A1 | 6/2009 | Goss et al. | |

OTHER PUBLICATIONS

European Search Report mailed Jan. 16, 2012 for European App. No. 11177983, 7 pages.
International Search Report and Written Opinion from PCT/US11/61197, dated Mar. 29, 2012, Apple Inc., 9 pages.

\* cited by examiner

*Primary Examiner* — Stephen Elmore
*Assistant Examiner* — Mark Giardino, Jr.
(74) *Attorney, Agent, or Firm* — Lawrence J. Merkel; Meyertons, Hood, Kivlin, Kowert & Goetzel, P.C.

(57) ABSTRACT

In an embodiment, a combining write buffer is configured to maintain one or more flush metrics to determine when to transmit write operations from buffer entries. The combining write buffer may be configured to dynamically modify the flush metrics in response to activity in the write buffer, modifying the conditions under which write operations are transmitted from the write buffer to the next lower level of memory. For example, in one implementation, the flush metrics may include categorizing write buffer entries as "collapsed." A collapsed write buffer entry, and the collapsed write operations therein, may include at least one write operation that has overwritten data that was written by a previous write operation in the buffer entry. In another implementation, the combining write buffer may maintain the threshold of buffer fullness as a flush metric and may adjust it over time based on the actual buffer fullness.

13 Claims, 6 Drawing Sheets

COMBINING WRITE BUFFER WITH DYNAMICALLY ADJUSTABLE FLUSH METRICS

BACKGROUND

1. Field of the Invention

This invention is related to the field of processors and, more particularly, to combining write buffers in caches.

2. Description of the Related Art

Processors often implement combining write buffers to capture write operations that have been written to a higher level write-through cache (e.g. an L1 cache), to buffer those writes prior to updating a lower level cache (e.g. an L2 cache). The combining write buffer combines two or more write operations that target data within the same cache block, and thus present fewer writes to the L2 cache.

The combining write buffer can accumulate write operations for some time. Determining when to flush write operations from one or more combining write buffer entries is a tradeoff between bandwidth and performance. Buffering write operations in the combining write buffer can lead to better bandwidth efficiency. On the other hand, if data is buffered for too long, the performance may suffer as data that needs to be pushed to lower level caches or memory remains in the combining write buffer.

SUMMARY

In an embodiment, a combining write buffer is configured to maintain one or more flush metrics to determine when to transmit write operations from buffer entries. The combining write buffer may be configured to dynamically modify the flush metrics in response to activity in the write buffer, modifying the conditions that cause write operations to be transmitted from the write buffer to the next lower level of memory. Thus, the performance/bandwidth tradeoff may be dynamically adjusted based on the detected activity.

In one implementation, the flush metrics may include categorizing write buffer entries as "collapsed." A collapsed write buffer entry, and the collapsed write operations therein, may include at least one write operation that has overwritten data that was written by a previous write operation in the buffer entry. Such entries may continue to accumulate write operations which overwrite previous data, and thus at least some of the data may be temporary data that is not to be accessed again soon. For example, the write operations in the write buffer entry may be part of a register spill area in memory where register values from the processor are written to make the registers available to store other data. Collapsed write buffer entries may not be considered when determining if the write buffer fullness has reached a specified threshold at which the combined write operations in one or more write buffer entries are transmitted to the next level of memory. The collapsed entries in the buffer may be temporarily ignored in the threshold calculation.

In another implementation, the combining write buffer may maintain the threshold of buffer fullness as a flush metric. The buffer may monitor for buffer full events. If a buffer full event is detected, then the threshold may be too high for the current activity level and may be reduced. On the other hand, if a number of consecutive write operations are received into the buffer without detecting a buffer full event, then the threshold may be too low and the threshold may be increased. Accordingly, based on the actual buffer fullness that is detected over time, the threshold may be adjusted.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
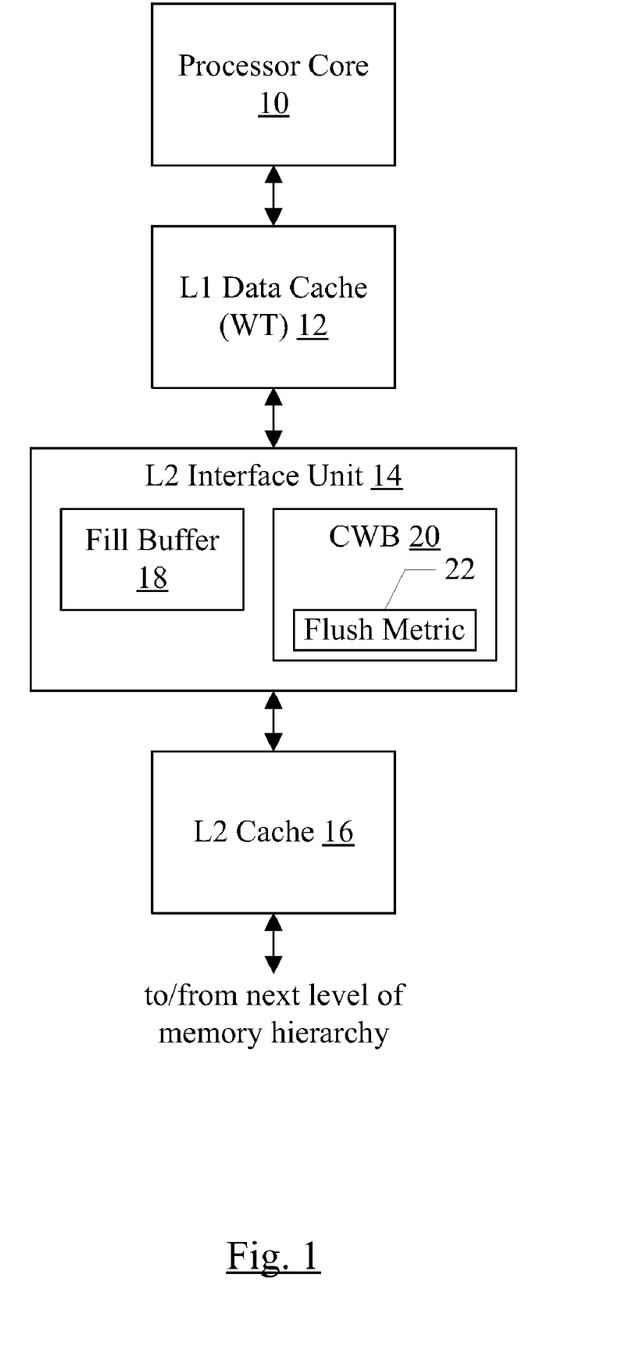
FIG. 1 is a block diagram of one embodiment of a processor core, caches, and a write combining buffer.

Turning now to FIG. 1, a block diagram of one embodiment of a processor core 10, a first level (L1) data cache 12, a second level (L2) interface unit 14, and an L2 cache 16 is shown. The L2 interface unit 14 may include a fill buffer 18 and a combining write buffer (CWB) 20. The CWB 20 may be configured to maintain one or more flush metrics 22. The processor core 10 is coupled to the L1 data cache 12, which is coupled to the L2 interface unit 14. The L2 interface unit 14 is further coupled to the L2 cache 16, which may further be coupled to the next level of memory in the memory hierarchy (not shown in FIG. 1).

The processor core 10 may implement any instruction set architecture, and may include the circuitry to execute the instructions defined in the instruction set architecture. In various embodiments, the processor core 10 may implement any microarchitecture, including superscalar or scalar, superpipelined or pipelined, out of order or in order, speculative or non-speculative, etc. Various embodiments may employ microcoding techniques or not, as desired.

The instruction set architecture implemented by the processor core 10 may specify explicit load instructions defined to transfer data from memory to the processor (e.g. to a register in the processor) and explicit store instructions defined to transfer data from the processor to memory. Either transfer may be completed in cache in various embodiments. Alternatively or in addition, the instruction set architecture may specify implicit loads and stores (e.g. for an instruction that performs a non-load/store operation on a memory operand). Accordingly, the processor core 10 may be said to execute or perform a load operation or a store operation. The load/store operation may be derived from the explicit instruction or the implicit load/store.

The processor core 10 may be configured to generate a read operation in response to a load operation and may be configured to generate a write operation in response to a store operation. The read/write operations may be propagated to a memory hierarchy that includes one or more levels of cache and a main memory system. The caches may cache data that is also stored in the main memory subsystem, and data is the memory hierarchy is identified by a memory address defined in a memory address space corresponding to the main memory system. For example, in the embodiment of FIG. 1, the L1 and L2 caches may be levels of memory in the memory hierarchy. There may be additional levels, including the main memory level and optionally one or more additional levels of cache. Other embodiments may not include the L2 cache 16 and the next level of memory from the L1 cache may be the main memory subsystem. Generally, a read/write operation may be enter the memory hierarchy at the top (the level nearest the processor core 10), and may programmed from one level to the next until the operation is complete. The main memory subsystem may be the lowest level in the memory hierarchy. Data may be moved to and from the main memory subsystem by various peripheral device such as mass storage devices (e.g. disk drives) or network devices, but the data is not identified by the memory address on these devices (e.g. the mass storage devices may have their own address space for locating data on the device, or the network to which the network device is connected may include its own address space identifying devices on the network).

The read operation may be completed when the data for the read is returned from the memory hierarchy (e.g. any level of cache, or the main memory subsystem), and the write operation may be completed via the processor core 10 sending the write data. The write operation may include the address, an indication of the size of the write (e.g. in terms of bytes), and the write data. The write operation may also include other attributes of the write (e.g. cacheability, coherence, etc.).

The data cache 12 may implement any capacity and configuration (e.g. direct mapped, set associative, etc.). The data cache 12 may be configured to allocate and deallocate storage in the cache in units of cache blocks. A cache block may have any size (e.g. 32 bytes, 64 bytes, 128 bytes, etc.), and may be aligned in memory at a natural address boundary for the block size (e.g. a cache block of 32 bytes may be aligned to a 32 byte boundary, a cache block of 64 bytes may be aligned to a 64 byte boundary, etc.).

In the illustrated embodiment, the data cache 12 is write-through (WT). In a write-through cache, write operations which hit in the cache are propagated to the next level of memory in addition to updating the cache block in the cache. Write operations which miss the cache are also propagated to the next level of memory. On the other hand, a write-back cache (or store-in cache) may update the stored cache block and may not propagate the write operation. Instead, the updated cache block may eventually be written back to the next level of memory when it is evicted from the cache.

The L2 interface unit 14 may receive the write operations from the L1 data cache 12 and may also receive read cache misses (as fill requests). The L2 interface unit 14 may be configured to store the write operations in the CWB 20, and to store the fill requests in the fill buffer 18. Fill requests may be transmitted to the L2 cache 16 (and lower levels of the memory hierarchy as needed), and the fill data may be returned to the L1 data cache 12 and may be written to the L1 data cache 12.

The CWB 20 may buffer the write operations, and transmit them to the L2cache 16 at various points in time. The write operations may include write-through writes that hit in the cache 12 and updated the cache block therein. The write operations may also include write-through writes that missed in the data cache 12. The CWB 20 may include multiple buffer entries. Each buffer entry may be configured to store write operations on a cache block granularity. That is, the entry may be allocated for a cache block-sized entity aligned to cache block boundary in memory. Any writes within the cache block may be stored in the allocated entry. An initial write operation within the cache block may cause the CWB 20 to allocate the entry, and the write data may be stored in the buffer along with the address and an indication of which bytes within the cache block are updated (e.g. a byte mask). Subsequent write operations may be merged into the buffer, writing the data into the appropriate bytes within the cache block and updating the byte mask.

The CWB 20 may be configured to accumulate one or more flush metrics 22 to determine when to transmit one or more combined write operations from buffer entries to the L2 cache 16. The CWB 20 may be configured to monitor the activity in the write buffer to determine the flush metrics 22. Thus, flush metrics may generally be dynamically-generated data that may be used by the CWB 20 to determine when to transmit the combined write operations (or flush the write buffer entry or entries) to the next level of memory. Because the flush metrics are dynamically generated, the frequency at which the combined write operations are flushed may vary over time based on the detected write buffer activity. That is, the flush metrics may be used along with the fullness of the write buffer (that is, the number of buffer entries that are occupied as compared to the total number of buffer entries) to determine when to transmit one or more combined write operations to the next level of memory.

For example, in one embodiment, the flush metrics may include the detection of collapsed write buffer entries. A collapsed write buffer entry may be an entry in which: at least one write operation has been merged into the entry; and the write operation has overwritten at least one byte of write data that was written to the entry by a previous write operation. For example, if a byte mask is maintained to indicate which bytes within the cache block are updated, the collapsed write may be detected if a write operation is merged into the entry and at least one bit of the byte mask that would be set due to the merging write operation is already set. Other embodiments may detect the collapse at other levels of granularity with the cache block (e.g. word, double word, etc.). Other embodiments may only detect a collapsed write if all bytes updated by the write have their corresponding mask bits set prior to the collapsed write. That is, a collapsed write may be detected if the byte mask is the same value before and after the collapsed write is merged.

The CWB 20 may be configured to remove the collapsed write buffer entries from consideration in detecting write-buffer fullness. For example, the CWB 20 may be configured to transmit combined write operations from one or more write buffer entries as the CWB 20 approaches full (e.g., when a threshold level of fullness is met). Since the collapsed write buffer entries are not considered in determining write buffer fullness for flush write entries, the write buffer may tend to become more full (in terms of occupied entries) when collapsed write buffer entries are detected in the write buffer than when collapsed write buffer entries are not detected in the write buffer. In one embodiment, a fixed or programmable threshold value may be used to determine that the CWB 20 is approaching full. The count of entries that are in use may be compared to the threshold value, less any entries that are in collapsed state. When the threshold value is reached (e.g. met or exceeded), the CWB 20 may flush one or more write buffer entries. In an embodiment, the CWB 20 may flush one write buffer entry in response to reaching the threshold value, and may continue to flush write buffer entries until the number of occupied write buffer entries drops below the threshold value. In other embodiments, more than one write buffer entry may be flushed concurrently. Since the collapsed write buffer entries are not counted toward the fullness threshold, write buffer entries may be flushed less frequently than when there are no collapsed write buffer entries.

Flushing a write buffer entry may involve one or more combined write operations. For example, for each set of contiguous updated bytes in the entry, one write operation may be generated. If there are gaps of non-updated bytes in the entry, multiple write operations may be transmitted. In other embodiments, one combined write operation per write entry may be transmitted with a byte mask or other indication identifying which bytes are to be updated within the cache block. In still other embodiments, writes of a given size (e.g. a word) may be generated.

In another embodiment, the flush metrics 22 may include the threshold value. The threshold value may be dynamically modified based on the detection of write buffer full events. The write buffer full events may indicate that the write buffer is actually full (all buffer entries allocated to write operations). Accordingly, the CWB 20 may flush write entries based on the threshold value, and may detect the buffer full events to indicate that the threshold value is to be modified. For example, if a buffer full event is detected, the CWB 20 may determine that the threshold value is too high (e.g. too close to buffer full), causing the write buffer to fill before flushing of an entry can be completed. The full buffer may impact processor core performance. Accordingly, the threshold value may be reduced in response to the buffer full event. On the other hand, if a certain number of write operations are written to the buffer without detecting a buffer full event, the threshold value may be too low (e.g. too far from buffer full) and may be increased.

Accordingly, the threshold may be adapted over time based on whether the buffer is becoming full or not. If traffic is causing the buffer to fill more quickly, the threshold may be reduced. In this fashion, writes may not back up in the buffer and cause the processor core 10 to stall. If traffic is causing the buffer to fill less quickly, the threshold may be increased. Therefore, the buffer may be permitted to store write operations longer, reducing traffic (and power consumption) in the L2 cache 16. That is, the frequency of transmitting writes from a write buffer entry to the L2 cache 16 may increase and decrease with changes to the threshold.

In other embodiments, other flush metrics may be accumulated (e.g. how frequently a full cache block of writes is buffered, snoop hits in the buffers, etc.). The frequency of flushing write buffer entries to the L2 cache 16 may be modified based on these metrics as well. For example, the frequency of flushing may be increased if snoop hits are being detected (indicating that other processor cores or circuits in the system are using the data being written).

In some embodiments, the write operations stored in the CWB 20 may further include non-cacheable write operations. The non-cacheable write operations may be write-combinable, and may be merged into a buffer entry similar to the write-through writes discussed above. Other non-cacheable write operations may not be write-combinable (or write combining of non-cacheable writes may not be supported). In such cases, each non-cacheable write operation may be allocated its own separate entry in the CWB 20. Other embodiments may store non-cacheable write operations in a different write buffer.

The L2 cache 16 may be of any size and construction, similar to the discussion above for the data cache 12. The L2 cache 16 may be write back or write-through, in various embodiments. The L2 cache 16 may further include an interface to the next level of memory, which may be the main memory subsystem or a third level (L3) cache in various embodiments.

It is noted that a combining write buffer (CWB) 20 may included between other levels of the memory hierarchy as well. For example, a CWB 20 may be included below any cache level that is write-through. It is noted that, in an embodiment, the processor core 10, the L1 data cache 12, and the L2 interface 14 (including the fill buffer 18 and the CWB 20) may be integrated together as a processor. In other embodiments, the L2 interface 14 may be shared with another processor core 10/L1 data cache 12. In still other embodiments, the L2 cache 16 may be integrated into the processor, and or other components may be integrated (e.g. in a system on a chip configuration).

Figure 2:
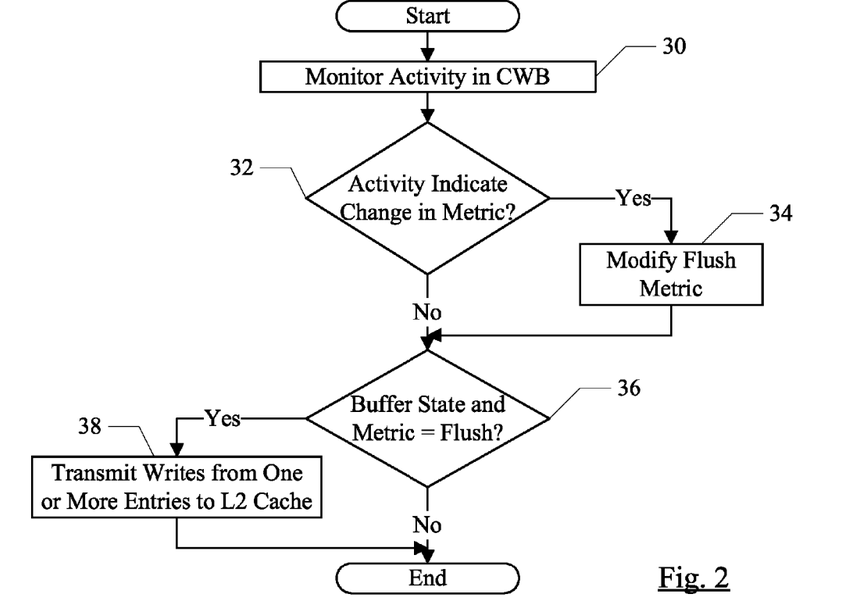
FIG. 2 is a flowchart illustrating operation of one embodiment of the combining write buffer at a high level.

Turning next to FIG. 2, a flowchart illustrating operation of one embodiment of the CWB 20 is shown. While blocks are shown in a particular order for ease of understanding, other orders may be used. Blocks may be performed in parallel in combinatorial logic in the CWB 20. Blocks, combinations of blocks, and/or the flowchart as a whole may be pipelined over multiple clock cycles. The CWB 20 may be configured to implement the operation shown in FIG. 2.

The CWB 20 may be configured to monitor activity in the write buffer (block 30). For example, fullness of the buffer, numbers of write operations merged into the buffer, collapsed writes, etc. may be monitored by the CWB 20. If the detected activity indicates a change in a flush metric maintained by the CWB 20 (decision block 32, "yes" leg), the CWB 20 may modify the flush metric (block 34). If a combination of buffer state and the flush metric(s) 22 indicates a flush of one or more buffer entries (decision block 36, "yes" leg), the CWB 20 may be configured to transmit one or more combined write operations from one or more buffer entries to the L2 cache 16 (block 38). More generally, the write operations may be transmitted to the next level of memory in the memory hierarchy.

Figure 3:
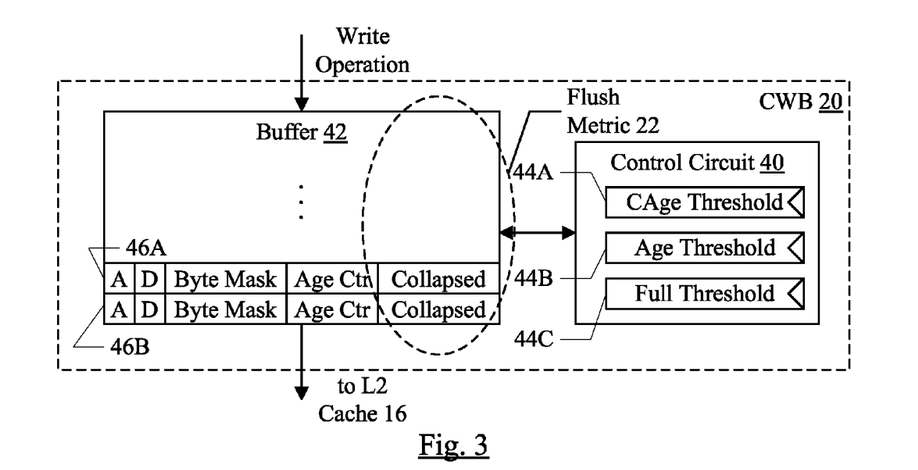
FIG. 3 is a block diagram of one embodiment of the combining write buffer.

Turning now to FIG. 3, a block diagram of one embodiment of the CWB 20 is shown. In the embodiment of FIG. 3, the CWB 20 includes a control circuit 40 coupled to a write buffer 42. The buffer 42 is coupled to receive write operations from the L1 data cache 12, and to provide combined write operations to the L2 cache 16 (or more generally to the next level of memory in the memory hierarchy). The control circuit 40 includes a set of registers 44A-44C which may store a collapse age (CAge) threshold, an age threshold, and a full threshold, respectively. The registers 44A-44C may be implemented as one register or multiple registers in general, and may be software addressable for programmability in some embodiments. In other embodiments, one or more of the thresholds may be fixed.

Exemplary entries 46A-46B in the buffer 42 are shown in FIG. 3 and each entry includes an address field (A), a data field (D), a byte mask field (Byte Mask), an age counter field (Age Ctr), and a collapsed state field (Collapsed). Additional entries similar to the illustrated entries may be included in the buffer 42. Taken together, the collapsed states across all the entries may represent a flush metric 22. The address field may store the address of the cache block represented in the entry, and the data field may include storage for the cache block of data, although the entire cache block may not be valid. That is, the entry may store a partial cache block of valid data at any given time. The byte mask field may include a bit for each byte in the cache block. The bit may indicate whether or not the corresponding byte is valid in the data field (that is, whether or not the byte has been written by a write operation represented in the entry). In one embodiment, the mask bit may be set to indicate that the byte is valid and may be clear to indicate invalid, although other embodiments may use the opposite meanings for the set and clear states. The age counter may indicate the age of the entry. The age counter may initially be set to zero, and may be incremented each clock cycle that the write is in the buffer 42 or for each write operation that is presented to the buffer 42. In other embodiments, the age counter may be initialized/reset to a defined value and decremented. The collapsed state may indicate whether or not the entry is collapsed. That is, the collapsed state may indicate whether or not at least one collapsed write has been detected for the entry. The collapsed state may, e.g., be a bit indicative when set that the entry is collapsed and indicative when clear that the entry is not collapsed (or vice versa). Other embodiments may use other indications of the state.

Figure 4:
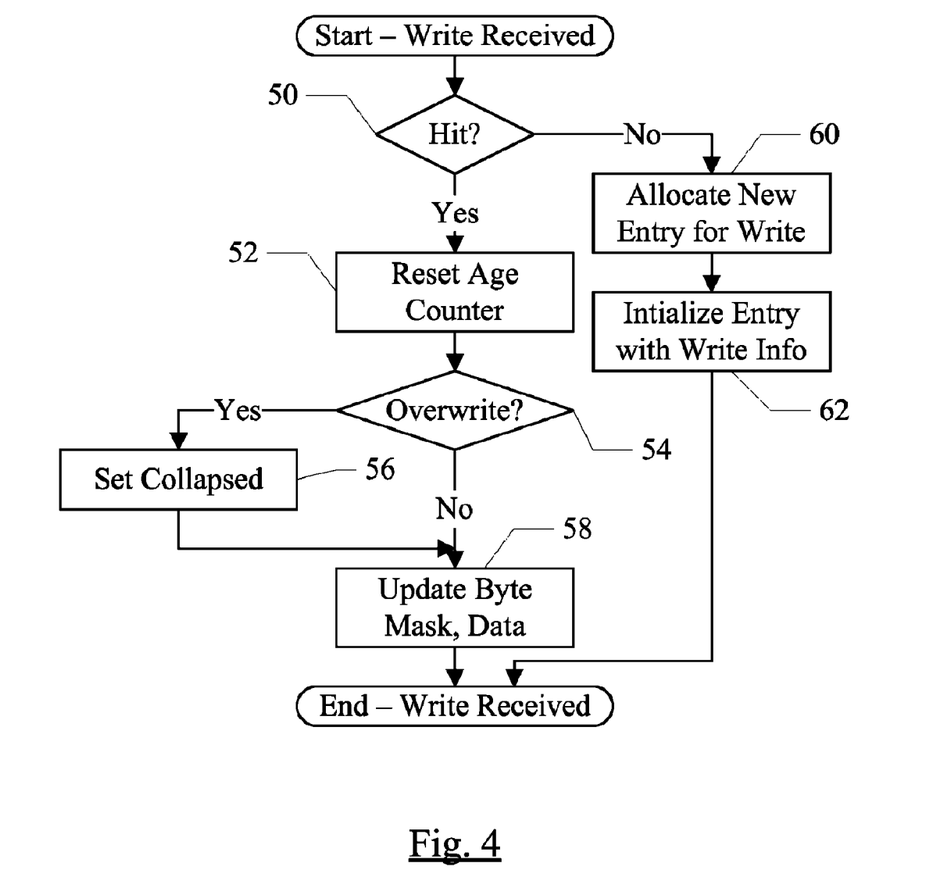
FIG. 4 is a flowchart illustrating operation of one embodiment of the combining write buffer shown in FIG. 3 in response to receive a write operation.

Turning now to FIG. 4, a flowchart is shown illustrating operation of one embodiment of the CWB 20 illustrated in FIG. 3 in response to receiving a write operation from data cache 12. While blocks are shown in a particular order for ease of understanding, other orders may be used. Blocks may be performed in parallel in combinatorial logic in the CWB 20. Blocks, combinations of blocks, and/or the flowchart as a whole may be pipelined over multiple clock cycles. The CWB 20, and particularly the control circuit 40, may be configured to implement the operation shown in FIG. 4.

The CWB 20 may be configured to compare the address of the write operation and the addresses in the write buffer 42 (on a cache line granularity). For example, the address field of the entries in the write buffer 42 may be implemented as a content addressable memory (CAM). If the write operation is a hit in a buffer entry (that is, the write operation is within the cache block represented by the entry—decision block 50, "yes" leg), the control circuit 40 may be configured to reset the age counter in the entry (block 52). Thus, the age counter may be the age of the entry since the most recent write operation was merged into the entry in this embodiment. If the write operation overwrites at least one byte that was already written to the entry by a previous write operation (decision block 54, "yes" leg), the control circuit 40 may be configured to set the collapsed state to indicate collapsed (block 56). The control circuit 40 may be configured to update the byte mask and to cause the data to be written to the data field of the hitting entry.

If the write operation is a miss in the buffer 42 (decision block 50, "no" leg), the control circuit 40 may be configured to allocate a new (currently unoccupied) entry for the write operation (block 60). The control circuit 40 may initialize the allocated entry with information corresponding to the write operation (block 62). Particularly, the control circuit 40 may cause the allocated entry to update with the address and data of the write operation, may set the byte mask to indicate the bytes updated by the write, may clear the age counter, and may clear the collapsed state. If the write buffer is full (that is, there is no currently unoccupied entry), the control circuit 40 may back pressure the L1 data cache 12/processor 10 to stall the write operation until an entry is available.

The decision block 54 and the set collapsed state 56 may be the equivalent of the decision block 32 and the block 34, respectively, for the embodiment of the CWB 20 shown in FIG. 3.

Figure 5:
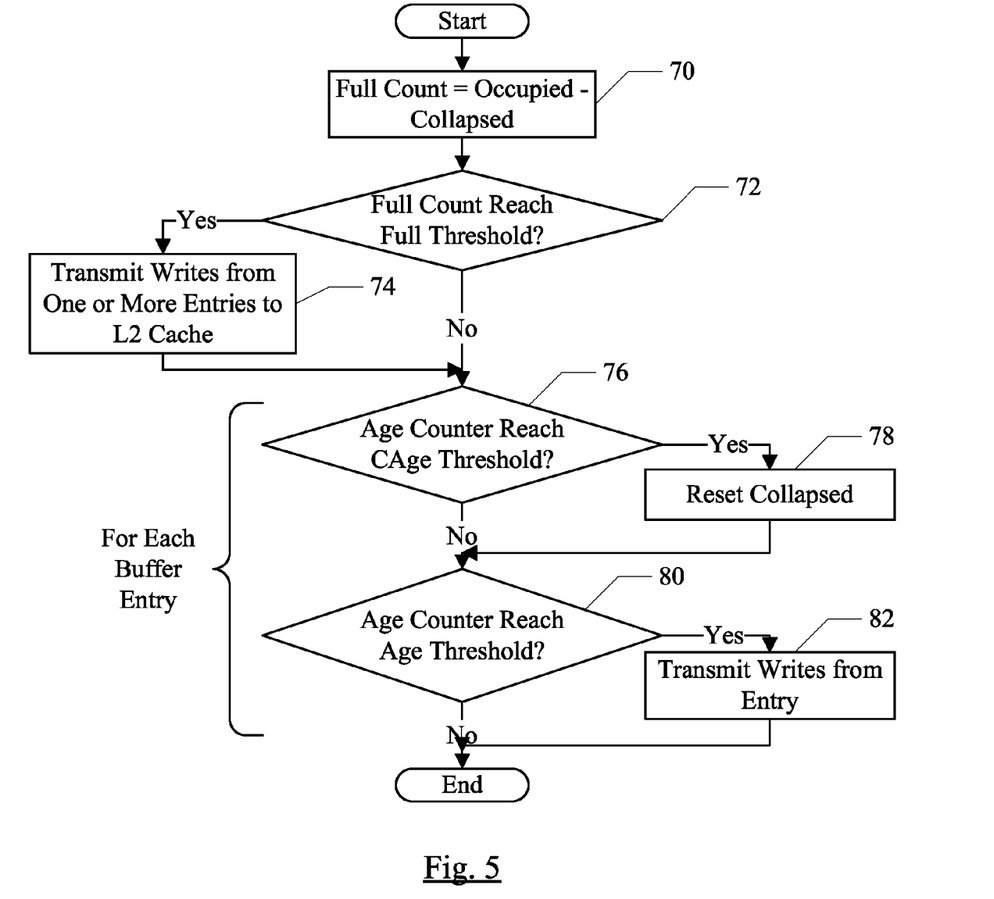
FIG. 5 is a flowchart illustrating operation of one embodiment of the combining write buffer shown in FIG. 3 to evaluate the flush metrics.

Turning now to FIG. 5, a flowchart is shown illustrating operation of one embodiment of the CWB 20 illustrated in FIG. 3 to evaluate the buffer entries and determine flush events. While blocks are shown in a particular order for ease of understanding, other orders may be used. Blocks may be performed in parallel in combinatorial logic in the CWB 20. Blocks, combinations of blocks, and/or the flowchart as a whole may be pipelined over multiple clock cycles. The CWB 20, and particularly the control circuit 40, may be configured to implement the operation shown in FIG. 5.

The control circuit 40 may be configured to determine a full count as the number of occupied entries less the number of collapsed entries (block 70). That is, the full count may be the number of non-collapsed entries. If the full count has reached the full threshold 44C (decision block 72, "yes" leg), the control circuit 40 may be configured to transmit the combined write operations from one or more entries to the L2 cache 16, or the next level of the memory hierarchy (block 74). The control circuit 40 may be configured to select any entry to transmit write operations to the L2 cache 16. For example, in an embodiment, the control circuit 40 may select the oldest entry (as indicated by the age counter) that is not a collapsed entry. In another embodiment, both collapsed and non-collapsed entries may be considered for selection based on age. In another embodiment, the entries may be flushed in first in, first out (FIFO) order of their allocation. The combination of blocks 70 and 72 may be the equivalent of block 36, and the block 74 may be the equivalent of block 38, in this embodiment. In another embodiment, an additional threshold may be defined (higher than the full threshold) to be compared against the total number of occupied entries (both collapsed and non-collapsed). If the total number of occupied entries reaches the additional threshold, the control circuit 40 may be configured to transmit combined write operations from one or more buffer entries to the L2 cache 16 (block 74).

The remainder of the flowchart illustrated in FIG. 5 may be applied to each buffer entry in the buffer 42 (e.g. in parallel for each buffer entry). If the age counter has reached the collapsed age threshold 44A (decision block 76, "yes" leg), the control circuit 40 may be configured to reset the collapsed state in the entry, indicating non-collapsed (block 78). Thus, since the age counter is reset at each write hit to the entry in this embodiment, the collapsed entry will no longer be considered collapsed after a number of clock cycles equal to the collapsed age threshold have elapsed without another write hit to the entry. If the age counter has reached the age threshold 44B (decision block 80, "yes" leg), the control circuit 40 may be configured to flush the entry (block 82), transmitting one or more combined write operations for the entry. Blocks 80 and 82 may be another equivalent for blocks 36 and 38, respectively, for this embodiment.

Figure 6:
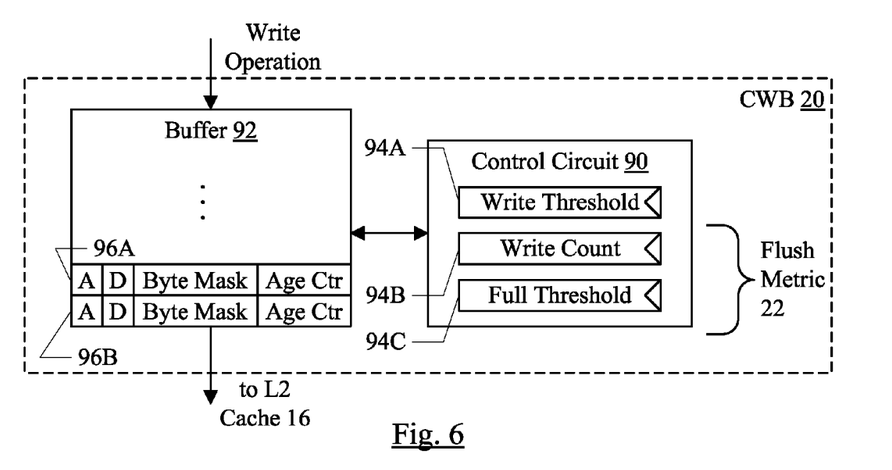
FIG. 6 is a block diagram of another embodiment of the combining write buffer.

Turning now to FIG. 6, a block diagram of another embodiment of the CWB 20 is shown. In the embodiment of FIG. 6, the CWB 20 includes a control circuit 90 coupled to a write buffer 92. The buffer 92 is coupled to receive write operations from the L1 data cache 12, and to provide combined write operations to the L2 cache 16. The control circuit 90 includes a set of registers 94A-94C which may store a write threshold, a write count, and a full threshold, respectively. The registers 94A-94C may be implemented as one register or more than one register in general, and may be software addressable for programmability in some embodiments. In other embodiments, the write threshold may be fixed.

In the embodiment of FIG. 6, the combination of the write count 94B and the full threshold 94C may be a flush metric 22. The write count 94B may be a count of write operations that have been stored in the buffer 92 since the most recent buffer full event. The full threshold 94C may be the threshold of buffer entries to be occupied before a flush is performed, in this embodiment. The full threshold 94C may be varied based on write buffer activity, as discussed below.

Exemplary entries 96A-96B are shown in FIG. 6. Additional entries similar to the illustrated entries may be included. The embodiment of FIG. 6 includes an address field (A), a data field (D), a byte mask field (Byte Mask), and an age counter (Age Ctr) field similar to the same fields described above with regard to FIG. 3.

Figure 7:
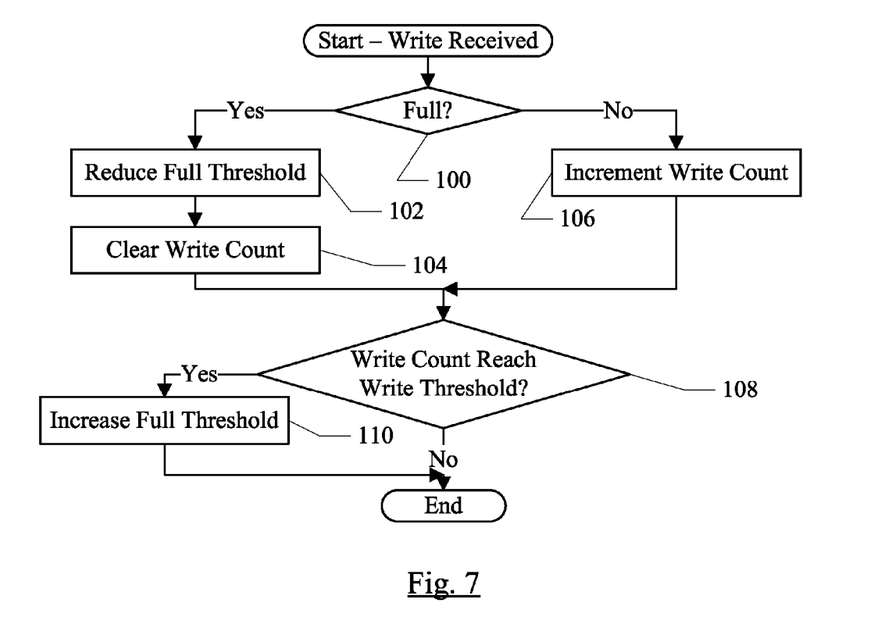
FIG. 7 is a flowchart illustrating operation of one embodiment of the combining write buffer shown in FIG. 6 in response to receive a write operation.

FIG. 7 is a flowchart illustrating operation of one embodiment of the CWB 20 illustrated in FIG. 6 in response to receiving a write operation. While blocks are shown in a particular order for ease of understanding, other orders may be used. Blocks may be performed in parallel in combinatorial logic in the CWB 20. Blocks, combinations of blocks, and/or the flowchart as a whole may be pipelined over multiple clock cycles. The CWB 20, and particularly the control circuit 90, may be configured to implement the operation shown in FIG. 7. In addition to the operation shown in FIG. 7, the embodiment of FIG. 6 may detect a hit or miss in the buffer 92 and may update the entries accordingly as illustrated in blocks 50, 52, 58, 60, and 62 in FIG. 4, and may implement blocks 72 and 74 in FIG. 5 as well. Optionally, the embodiment of FIG. 6 may also implement block 80 and 82 of FIG. 5 in some embodiments.

The control circuit 90 may be configured to determine if the received write operation fills the buffer 92 (decision block 100). For example, if the received write operation is a miss in the buffer 92 and the last non-occupied entry is allocated to the received write operation, the buffer 92 is full. If so (decision block 100, "yes" leg), the control circuit 90 may be configured to reduce the full threshold 94C (block 102) and to clear the write count 94B (block 104). On the other hand (decision block 100, "no" leg), the control circuit 90 may be configured to increment the write count 94B if the received write operation does not cause a full event (block 106). If the write count has reached the write threshold (decision block 108, "yes" leg), the control circuit 90 may be configured to increase the full threshold. In this embodiment, the flowchart of FIG. 7 may be the equivalent of blocks 32 and 34 in FIG. 3.

Accordingly, the full threshold may be dynamically modified in this embodiment to cause a flush of an entry (as illustrated in blocks 72 and 74, where the full count is the number of occupied entries in this embodiment) to prevent full events from occurring, while permitting the buffer 92 to get as full as possible based on the traffic detected in the CWB 20. The write count may be determined in any desired fashion. For example, if a given percentage of write operations are expected to be merged into write buffer entries, the write count may be equal to the product of the number of write operations per cache block (e.g. the number of words in the cache block), the number of write buffer entries, and the merge percentage.

Figure 8:
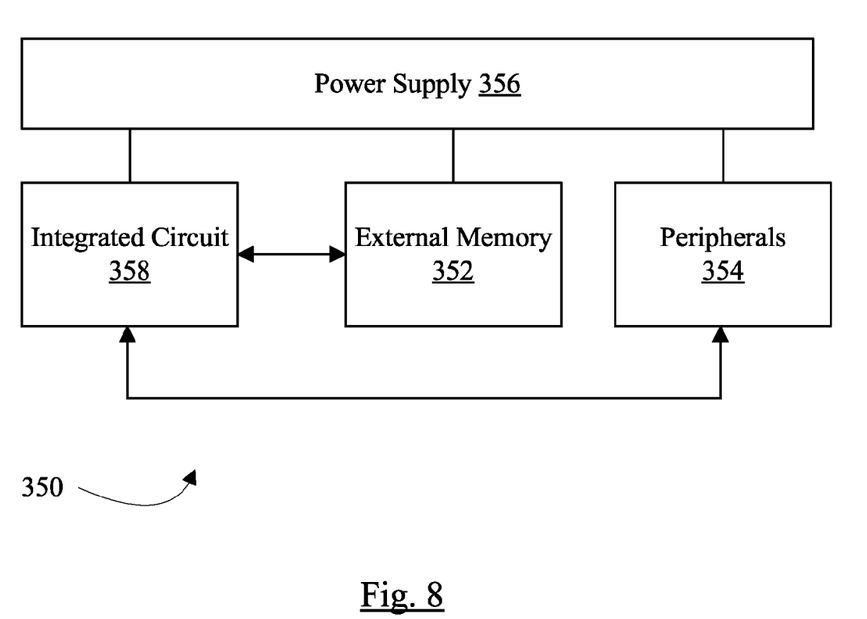
FIG. 8 is a block diagram of one embodiment of a system.

Turning next to FIG. 8, a block diagram of one embodiment of a system 350 is shown. In the illustrated embodiment, the system 350 includes at least one instance of an integrated circuit 358 coupled to an external memory 352. The external memory 352 may form the main memory subsystem discussed above with regard to FIG. 1. The integrated circuit 358 may include at least the processor core 10 and the L1 data cache 12 shown in FIG. 1 and may include one or more of the L2 interface unit 14 and the L2 cache 16. The integrated circuit 358 may further include other components as desired. The integrated circuit 358 is coupled to one or more peripherals 354 and the external memory 352. A power supply 356 is also provided which supplies the supply voltages to the integrated circuit 358 as well as one or more supply voltages to the memory 352 and/or the peripherals 354. In some embodiments, more than one instance of the integrated circuit 358 may be included (and more than one external memory 352 may be included as well).

The memory 352 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with an integrated circuit 358 in a chip-on-chip configuration, a package-on-package configuration, or a multi-chip module configuration.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
    a cache;
    a write buffer coupled to the cache and configured to buffer write operations that access the cache, wherein the write buffer comprises a plurality of entries, each entry configured to store combined write operations on a cache block granularity; and
    a control circuit coupled to the write buffer, wherein the control circuit is configured to cause the write buffer to transmit one or more combined write operations from one or more entries of the plurality of entries to a next level of memory below the cache responsive to one or more flush metrics applied by the control circuit and responsive to a fullness of the write buffer, and wherein the control circuit is configured to dynamically modify the one or more flush metrics responsive to activity in the write buffer, wherein dynamically modifying the one or more flush metrics changes a frequency at which the control circuit causes transmission of combined write operations from the write buffer to the next level of memory, and wherein the one or more flush metrics comprise a collapse state in each entry of the plurality of entries, wherein the collapse state indicates whether or not at least one collapsed write has been detected in the write operations combined in that entry, and wherein the control circuit is configured to cause the transmission of the one or more combined write operations responsive to the number of occupied buffer entries that are not in the collapse state reaching a threshold.

2. The apparatus as recited in claim 1 further wherein the control circuit is further configured to detect the collapsed write to a first entry, and to modify a first collapse state of the first entry to indicate collapsed.

3. The apparatus as recited in claim 2 further comprising an age counter corresponding to each entry of the plurality of entries, wherein the control circuit is configured to modify the collapsed state in a second entry of the plurality of entries to indicate not collapsed in response to the age counter reaching a second threshold, and wherein the control circuit is configured to reset the age counter is response to a write operation hitting in the second entry.

4. The apparatus as recited in claim 1 wherein the one or more flush metrics comprise a threshold of fullness of the write buffer, wherein the control circuit is configured to cause the one or more combined write operations to be transmitted responsive to a number of occupied entries in the write buffer reaching the threshold of fullness, and wherein the control circuit is configured to decrease the threshold responsive to detecting a buffer full event.

5. The apparatus as recited in claim 4 wherein the control circuit is configured to increase the threshold responsive to a predefined number of write operations being received without an occurrence of the buffer full event.

6. A method comprising:
a control circuit monitoring activity in a write buffer, wherein the monitoring comprises detecting a first write operation that hits in a first entry of the write buffer and that updates at least one byte, wherein the at least one byte is already updated in the first entry due to a previous write operation represented in the first entry;
responsive to detecting the first write operation, the control circuit modifying one or more flush metrics maintained by the control circuit, and wherein the one or more flush metrics comprise a state in each entry, and wherein the modifying comprises setting a state in the first entry indicating the detecting; and
the control circuit causing one or more write operations from at least one buffer entry in the write buffer responsive to the one or more flush metrics and a fullness of the write buffer, wherein the activity comprises a first number of consecutive write operations without filling the write buffer, and wherein the one or more flush metrics comprise a fullness threshold, and wherein the modifying comprises increasing the fullness threshold.

7. The method as recited in claim 6 wherein the activity comprises a buffer full event, and wherein the modifying comprises decreasing the fullness threshold.

8. A apparatus comprising:
a write buffer configured to accumulate writes to a plurality of cache blocks prior to writing a cache;
a circuit configured to monitor the write buffer and to adjust a threshold value that determines when an accumulated write is selected from the store buffer and written to the cache, wherein the circuit is configured to adjust the threshold value dependent on a frequency at which the write buffer becomes full and dependent on a number of writes that occur without the write buffer becoming full, and wherein the circuit is further configured to increase the threshold value responsive to detecting a first number of consecutive write operations without a buffer full event.

9. The apparatus as recited in claim 8 wherein the circuit is configured to detect the first number responsive to a count of consecutive write operations, wherein the circuit is configured to reset the count responsive to the buffer full event.

10. The apparatus as recited in claim 8 wherein the circuit is further configured to decrease the threshold value responsive to detecting a buffer full event.

11. An apparatus comprising:
a processor core configured to execute a store operation and to generate a first write operation responsive to the store operation;
a write-through cache coupled to receive the first write operation and configured to update a cache block in the cache with write data corresponding to the first write data responsive to detecting hit in the write through cache for the first write operation;
a combining write buffer configured to accumulate write operations from the write through cache including the first write operation, wherein the combining write buffer is configured to combine write operations within a cache block into one entry in the combining write buffer, and wherein the combining write buffer is configured to dynamically modify one or more flush metrics responsive to activity in the combining write buffer, wherein the combining write buffer is configured to determine when to transmit one or more combined write operations in response to the one or more flush metrics; and
a second level cache coupled to receive the combined write operations from the combining write buffer and configured to update cache blocks stored therein with the combined write operations.

12. The apparatus as recited in claim 11 wherein the one or more flush metrics comprise a collapsed state in each entry indicating that at least one write operation has been detected which overwrites at least one byte that is updated by a previous write operation in the entry.

13. The apparatus as recited in claim 11 wherein the one or more flush metrics comprise a full threshold, and wherein the full threshold is increased in response to detecting a first number of consecutive write operations without a buffer full event, and wherein the full threshold is decreased in response to detecting the buffer full event.

* * * * *